United States Patent [19]

Ahlén

[11] Patent Number: 4,591,270

[45] Date of Patent: May 27, 1986

[54] DISPERSIVE OPTICAL DEVICE

[75] Inventor: Hans O. S. Ahlén, Sollentuna, Sweden

[73] Assignee: Institutet för Optisk Forskning, Stockholm, Sweden

[21] Appl. No.: 346,044

[22] PCT Filed: Mar. 30, 1981

[86] PCT No.: PCT/SE81/00101

§ 371 Date: Jan. 26, 1982

§ 102(e) Date: Jan. 26, 1982

[87] PCT Pub. No.: WO81/03552

PCT Pub. Date: Dec. 10, 1981

[30] Foreign Application Priority Data

May 28, 1980 [SE] Sweden .................... 8003968

[51] Int. Cl.⁴ ............................. G01J 3/18
[52] U.S. Cl. .................... 356/333; 356/334; 350/162.17; 350/162.23
[58] Field of Search .............. 356/305, 328, 334, 333; 350/96.19, 162.11, 162.17, 162.2–162.23; 372/102

[56] References Cited

U.S. PATENT DOCUMENTS 3,698,795 10/1972 Flint .................... 356/333 X

FOREIGN PATENT DOCUMENTS

| 6126 | 1/1981 | Japan .................... 356/334 |
| 1319097 | 5/1973 | United Kingdom . |
| 1470810 | 4/1977 | United Kingdom . |
| 612535 | 2/1979 | U.S.S.R. .................... 350/162.2 |
| 672598 | 7/1979 | U.S.S.R. .................... 350/162.17 |

Primary Examiner—F. L. Evans
Attorney, Agent, or Firm—Burns, Doane, Swecker & Mathis

[57] ABSTRACT

A dispersive optical device for use such as a polarizer, spectroscope, monochromator or the like for utilization as a basic component for a monochromator, polarizer, spectroscope, spectrophotometer or the like, includes a dispersive optical member comprising a first and a second grating (3,4) planar parallel applied on a substrate, preferably reflection gratings with the same grating frequency, said gratings, (3,4) being applied with parallel grating rulings, whereby light defracted by the first grating is arranged to strike the second grating (4). The first grating (3) defines the element's input and the second grating (4) defines the element's output.

16 Claims, 9 Drawing Figures

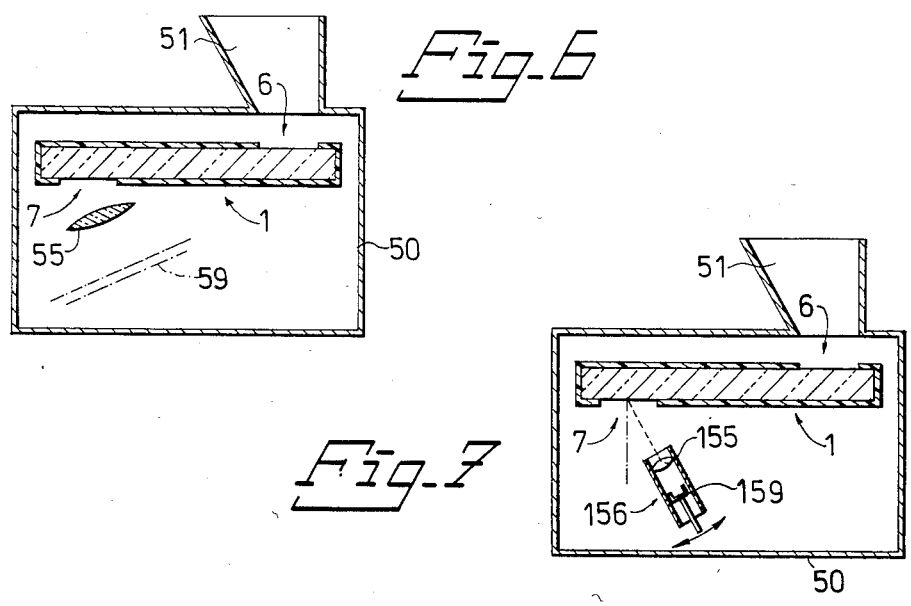
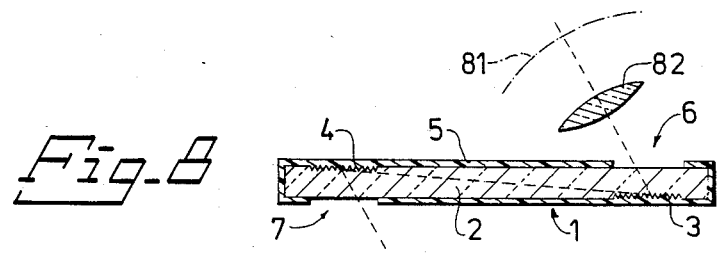
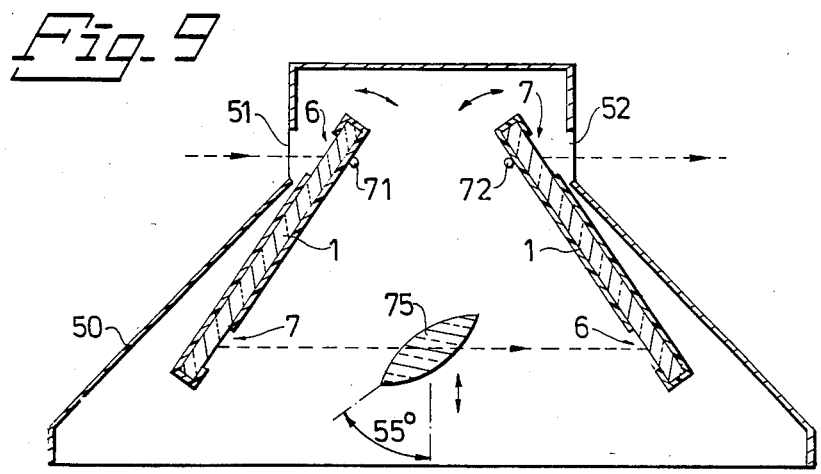

DISPERSIVE OPTICAL DEVICE

TECHNICAL FIELD

The invention relates to a dispersive optical device for use such as a spectroscope, polarizer, monochromator or the like, of for use as a basic component for a monochromator, spectograph, spectophotometer, polarizer or the like.

BACKGROUND

Conventional dispersive optical devices, such as those utilizable as spectroscopes or monochromators, have relatively large physical dimensions, are fragile, and contain slits and focussing elements which result in high production costs.

OBJECT

One object of the invention is to propose a dispersive device which can have small physical dimensions, is robust, can be produced at a relatively low cost, and has relatively high light strength and high resolution. Another object of the invention is to propose a dispersive device which furthermore allows through-sighting with transmission of an image which is in scale. Further objects and advantages of the invention will be apparent from the following.

SUMMARY OF THE INVENTION

The inventive dispersive optical device includes a dispersive optical member comprising a first and a second grating applied to planar parallel substrate surfaces, preferably reflection gratings which have the same grating frequency and have parallel grating scores or rulings, the second grating being adapted for being struck by a portion of the light defracted by the first grating, so that light which is defracted by the second grating is parallel with light incident on the first grating.

Since a greater defraction angle gives a greater angular dispersion, the angle between a normal to a grating and a line between the gratings should attain at least 60° and preferably at least 70°. The upper limit of the angle is 90°, for natural reasons, but attains in practice to about 88°. The angle is selected to advantage within the interval 80°–85°.

By selecting, for example, a relatively large distance between the gratings and a relatively narrow width for them, the angular variation will be small for rays between the gratings. This signifies that only a correspondingly small spectrum portion of parallel light incident on the first grating will strike the second grating. Since the gratings are mutually the same, light defracted by the second grating will be parallel to the light incident on the first grating. By measuring the angle of the member (i.e. the grating) to incident light, an indication can be obtained of the wavelength of the light observed at the member output. In a corresponding mode, when the member is utilized as a monochromator, for example, it can be arranged for light of a predetermined wavelength range to leave the output of the member by setting a given angle between incident light and the member. When the member is used as a monochromator, a focussing lens can be arranged behind the member output with a slit after the lens, suitably at its focal point, so that aligning errors are eliminated, as well as extraneous light wavelengths, only the whole of the pertinent pencil of rays being looked after.

It should further be clear that the dispersive member can be provided with wavelength scale which is readable at the output from the second grating, so that the wavelength of the light observed at the output of the second grating can be read off by eye directly.

In one embodiment of the invention, the member is built up on a transparent substrate with planar parallel surfaces, e.g. a plate of so-called float glass, a grating being arranged on each chief surface of the substrate at opposed ends thereof. The gratings are preferably protected by some kind of covering on their surfaces facing away from the substrate. It is further suitable for the whole member to be enclosed by a light-absorbing coating, e.g. a black paint, the refractive index of which is close to that of the substrate, except at the surfaces of the substrate used as input, output and total reflection surfaces.

According to another embodiment of the invention, the gratings can be arranged opposite, and adjacent each other between a first and a second planar parallel substrate, the substrates being arranged mutually parallel and adjacent. In such a case, a third planar parallel substrate is preferably arranged perpendicular to said first and second substrate at one end thereof. A mirror means can hereby be arranged at the free surface of the third substrate. Light which is defracted by the first grating can thus be arranged for total reflection at the free surface of the first substrate, for subsequently striking the first mirror means, whereat it is directed towards the free surface of the second substrate for being totally reflected there. The light can subsequently be arranged for directing towards the second grating, where it is defracted and departs from the member. The departing light will, however, be mirror-inverted in relation to the light incident on the first grating, although the member can be made such that light which is totally reflected at the free surface of the second substrate strikes a second mirror means at the free end of the second substrate, for direction towards the second grating with an angle of incidence corresponding to the defraction angle at the first grating.

In the embodiments where both gratings of the member are adapted mutually adjacent and opposite, the source of the light incident on the first grating can be observed with full sharpness and substantially without parallax. Said first and second gratings can possibly constitute opposing sides of a single grating element. In an embodiment of the dispersive member in which said first and said second grating are also mutually opposing, a light-absorbent coating should be arranged to surround the member excepting the substrate surfaces which form the input and output of the member and the substrate surface at which said total reflections are arranged to occur. By suitable selection of grating line density, width of grating and distance between the gratings in the ray path, it can be ensured that only light wavelengths within an interval determined by said factors strike the second grating. Due to the second grating having the same grating frequency as the first grating, light which is defracted in the second grating will have the same direction as light incident on the first grating. Said light wavelength range can be varied by varying the angle between the first grating and incident light.

The invention is defined in the appended claims.

In the following, the invention will be described in detail in the form of an example while referring to the appended drawing.

DRAWING

FIG. 1 schematically illustrates a first embodiment of a dispersive member incorporated in the device in accordance with the invention.

FIGS. 6 and 7 illustrate members according to FIG. 1, incorporated in a spectrograph and a spectrophotometer, respectively.

FIG. 8 illustrates a member in accordance with the invention, provided with an angle scale.

FIG. 9 illustrates a monochromator in accordance with the invention containing two members according to FIG. 1.

EMBODIMENT EXAMPLES

Figure 1:
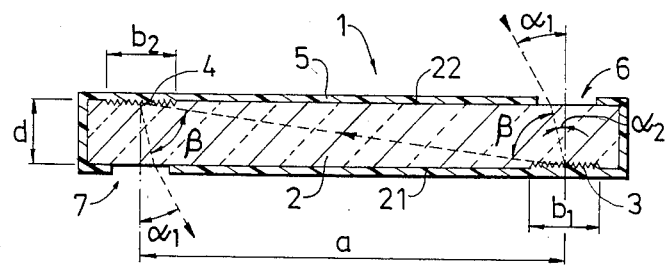

A dispersive member 1 is illustrated in FIG. 1, and includes a transparent substrate 2, e.g. of float glass, with planar parallel chief surfaces 21,22. At one end zone of the member 1 there is a first refletion grating 3 arranged on the surface 22. At the other end zone of said member 1 there is a second reflection grating 4 arranged on the surface 21. The substrate 2 and gratings 3,4 are outwardly covered by a light-absorbent medium 5, e.g. a black paint, with a refractive index as near to that of the substrate as possible, excepting at the substrate surfaces 6,7 opposite the respective grating 3,4. The surface 6 can be the input of the member, in which case the surface 7 constitutes its output.

The gratings 3,4 have the same grating frequency, and mutually parallel scores or rulings, extending normal to the plan of the FIG. 1. The function of the member is as follows. Assume that white light strikes the substrate surface 6 at an angle of incidence of $\alpha_1$. The light is refracted there so that the angle of incidence will be $\alpha_2$ to the grating 3. $\alpha_2$ is defined by the expression arcsin $((\sin \alpha_1)/n_2)$, $n_2$ being the substrate refractive index. At the grating 3, the light will be defracted according to the grating formula $$\sin\alpha_2 + \sin\beta_2 = \lambda \cdot \nu/n_2$$

where $\beta_2$ = defraction angle, $\lambda$ = wavelength of the light, and $\nu$ = grating frequency (lines /mm).

Only the portion of the light which is defracted within an angle between $\beta_{max}$ and $\beta_{min}$ will strike the grating 4. The following is applicable here:

$\beta_{max}$ = arctan $(a+(b_2+b_1)/2)/d$ and $\beta_{min}$ = arctan $(a-(b_2+b_1)/2)/d$;

where $b_1$ = width of grating 3, $b_2$ = width of grating 4, a = distance between centres of gratings 3, 4 and d = substrate thickness.

In this mode the grating 4 will only be struck by light with a wavelength between $\lambda_{max}$ and $\lambda_{min}$. ($\lambda_{max}$ and $\lambda_{min}$ are obtained by insertion of $\beta_{max}$ and $\beta_{min}$ in the grating formula above.)

A portion of the light incident on the grating 4 will be defracted. If grating 4 has the same frequency as grating 3, the defraction angle will be equal to the angle of incidence on the grating 3. i.e. $\alpha_2$. The light leaving the grating 4 will thus be parallel to the light incident on the grating 3.

Accordingly, it will be seen that the dispersive member according to FIG. 1 is utilizable as a spectroscope and is directly readable by the human eye.

By varying the angle of the member 1 to the light source which is to be studied, a portion of the spectrum of the light incident on the surface 6 can be scanned at the output 7.

Figure 3:
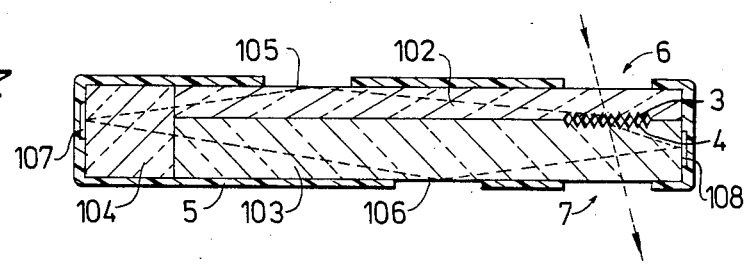
FIG. 3 illustrates an embodiment of the device according to FIG. 1.
Figure 4:
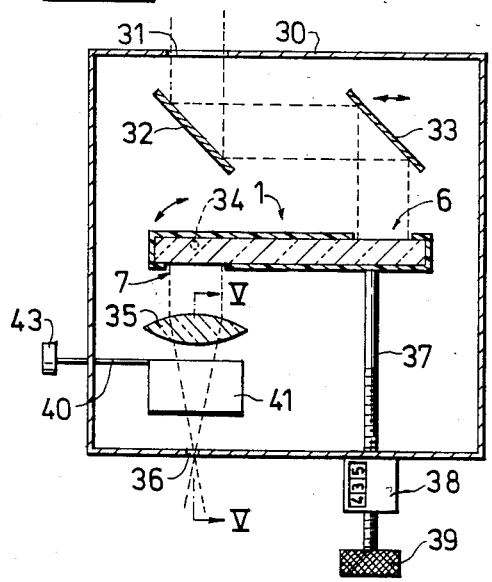
FIG. 4 illustrates a device in accordance with the invention, utilizable as a monochromator and including the member according to FIG. 1.

It should be similarly clear that by measuring the angle between the member 1 and the incident or departing light, and observing the surface 7 during a corresponding angle, a direct indication of the wavelength of the light observed at the output 7 can be obtained from the measured angle. It should also be clear that by setting said angle at a certain value in such a device, light departing from the output 7 can be obtained with a given wavelength, i.e. the device constitutes a so-called monochromator. FIG. 4 illustrates a member 1 according to FIG. 1, which is pivotably mounted about a shaft substantially in the plane of the grating parallel to the grating lines, and at half the width of the grating 3. The member 1 is enclosed in a housing 30 having an opening 31 opposite the grating 3. FIG. 3 illustrates a modified embodiment of a dispersive member in accordance with the invention. The function of the member according to FIG. 3 is the same as for the element according to FIG. 1. In the embodiment according to FIG. 3, the gratings are, however, arranged mutually opposite and adjacent, so that a direct through-sighting is enabled from the output 7 through the gratings and through the input 6, or in the opposite direction.

Figure 2:
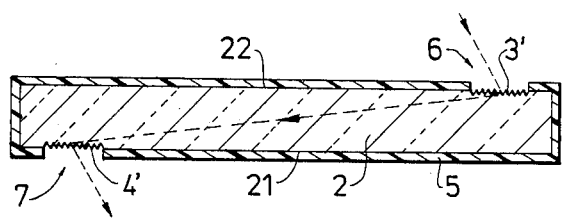
FIG. 2 illustrates an alternative embodiment of the device in accordance with the invention.

In the embodiment according to FIG. 2, transmission gratings 3',4' are utilized, which are applied to the substrate 2. Otherwise, the same conditions apply as for FIG. 1.

The member according to FIG. 3 includes two planar parallel substrates 102,103, on which the gratings 3,4 are applied directly opposite each other. The substrates 102, 103 are placed one against the other. At the left-hand end of the substrates 102,103 in FIG. 2, a third substrate 104 is abutted tightly against the ends of the substrates 102, 103. Both ends of the substrate 104 are provided with a reflecting coating 107,108 to form mirrors at right angles to the plane of the gratings 3,4. A light-absorbing coating 5 is applied to the member, excepting at its input 6 and output 7, and possibly the positions 105 and 106. At the positions 105 and 106 the free surfaces of the substrates 102,103 may be coated to allow total reflection of light defracted by the grating 3, as is illustrated by the dashed ray path. Alternatively, a medium with a lower refractive index than that of the substrate can be applied at the positions 105,106, whereat the coating 5 can be applied to the medium in the positions 105,106.

Incident light is defracted at the grating 3, mirrored at the position 105 at the mirror 106, and at the position 106 at the mirror 108 to strike the grating 4 at an angle of incidence corresponding to the defraction angle at the grating 3.

It should be clear that the position 106 can be directly contiguous to the output 7. In the device according to FIG. 3, light which departs from the output 7 will have the same direction as light incident on the input 6. A comparison between FIGS. 1 and 3 demonstrates that the member according to FIG. 3 allows direct throughsighting, and therefor avoids so-called parallax effects which can occur with the element according to FIG. 1.

Figure 5:
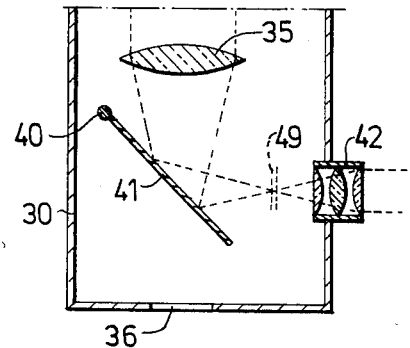
FIG. 5 is a section taken along the line V—V in FIG. 4.

FIGS. 4 and 5 illustrate a device in accordance with the invention, which includes a member according to FIG. 1 and is adapted for utilization as a monochromator and/or spectrograph or the like.

The monochromator according to FIG. 4 comprises a housing 30 with an opening 31 for incident light. At the opening 31 a wide slit can be arranged to afford a relatively large wavelength resolution. Furthermore, a focussing element can be arranged in connection with the opening to provide focussing towards the measuring point.

It is generally desirable to have the incident light parallel, focussing means being adapted for the purpose. A mirror 32 is arranged to deflect incident light by 90°.

A mirror 33, parallel to the mirror 32, deflects the light to the incident direction. The mirror 33 is arranged parallel displaceable at right-angles to the incident light. The mirror 33 is arranged to direct incident light to the input 6 of the element 1. The member 1 is pivotably mounted on a shaft 34, which is mounted in the plane of the grating 4 at half the width thereof. The shaft 34 extends in the normal plane of FIG. 4. The focussing lens 35 is arranged opposite the output 7 of the member 1 to focus departing light towards a slit 36 in the housing 30. The slit 36 is in a positin defined by a line through the shaft 34 parallel to the incident light. A screw 37 is connected to the member 1 in a position at a distance from the shaft 34. The screw 37 is adapted to provide pivoting of the member 1 about the shaft 34 when the screw is turned. Furthermore, the screw 37 or the member 1 is connected to the mirror 33 to provide parallel displacement of the mirror 33, so that light deflected by the mirror 33 strikes the input 6 of the member 1 irrespective of the pivotal position of the member. The screw 37 has a wheel 39 and is connected to a revolution counter indicating the angle of the member 1, and thus the light wavelength passing through the slit 36.

FIG. 5 illustrates a mirror 41, pivotably mounted on a shaft 40 with an operating wheel 43. An eyepiece 42 is mounted in the upper part of the housing 30. When the mirror 40 is swung upwards, the ray path is deflected towards the eyepiece 42. The lens 35 focusses in front of the eyepiece 42, and a graduation scale 49 is arranged at the focus of the lens 35. The scale 49 extends normal to the plane of the FIG. 5. The mirror 40 and eyepiece 42 thus allow visual scanning of the light, and the scale provides an indication of the wavelength in question.

FIG. 6 illustrates an apparatus housing 50 with an opening 51, in the housing 50 there is a member 1 according to FIG. 1, mounted with the input 6 opposite the opening 51, so that light coming through the opening strikes the input 6 substantially normal to the grating 3. A focussing lens 55 is arranged at the output 7 of the member 1, and a diode array 59 is arranged after the lens 55. This diode array can then sense the focussing position, and thereby register the detected wavelength. The apparatus according to FIG. 6 thus constitutes a spectograph. FIG. 7 illustrates a spectrophotometer in accordance with the invention, the rigidly mounted lens 55 and diode array 59 in FIG. 5 being replaced by a detector means 156, which is pivotable about a shaft through the centre of the grating 4. The means 156 contains a focussing lens 155 and a detector 159. For the detection of light against the detector 159, the angle of the means 156 to the grating 4 is red so that a purposeful registration of the scanned spectrum can be obtained.

FIGS. 6, 7 illustrate only two examples of a plurality of possible applications, wherein the member in accordance with the invention can be utilized.

FIG. 8 schematically illustrates a member according to FIG. 1 with an angle scale 81 and a focussing member 82 depicting the scale at infinity in front of the input 6. The scale 81 is suitably arranged visible in a marginal area of the image field.

The angle scale 81 and member 82 can of course be arranged in the apparatuses according to FIGS. 2 and 3 also.

The monochromator according to FIG. 9 can be said to contain two series-connected members according to FIG. 1. By utilizing two series-connected members 1, the departing light is caused to be coaxial with the incident light, and the wavelength of departing light can easily be adjusted by the angular setting of both members 1, whereby the member on the input side is pivotable about a shaft 71 at the centre of the grating 3 and the other member 1 is pivotable about a shaft 72 at the centre of the other grating 4. Pivoting both members is arranged to be done simultaneously and to the same extent, so that the angle to incident light of the first member is always the same as the angle of the second member to departing light. No focussing member is required in the apparatus according to FIG. 9. A focussing lens 75 with large focal length, which is arranged between the output of the first member and the input of the second member, has been found to almost double the light intensity of the monochromator, simultaneously as resolution is more or less doubled. To advantage, the lens 75 is arranged at an angle of about 55° to the ray path.

By the arrangement shown in FIG. 9 of the two members 1, with the input of the first member substantially in line with the output of the second member, there is obained very great resolution.

The large defraction angle at the first grating and the correspondingly large angle of incidence to the second grating in a member result in that departing light will be polarized, to a very grat extent. Apparatuses in accordance with the invention are therefore very well utilizable as polarizors, especially the apparatus according to FIG. 9.

I claim:

1. A dispersive optical device for use as an element for wave length separation in a monochromator, a spectroscope or the like, comprising a substrate assembly including an exterior surface having an inlet surface portion, an outlet surface portion and at least one reflecting surface portion, said substrate assembly also including first and second substrates positioned against one another, said first and second substrates having a first and a second reflection grating, respectively, said first and second reflection gratings facing said inlet and outlet surface portions, respectively, the first reflection grating arranged back to back to the second reflection grating, said first and second reflection gratings arranged so that their grating rules are parallel to each other, said reflecting surface portion directing light diffracted by the first reflection grating toward the second reflection grating, and a light-absorbent coating applied to said exterior surface except at said inlet, outlet and reflecting surface portions.

2. The device as claimed in claim 1, wherein the first reflection grating and the second reflection grating have a diffraction angle and an angle of incidence, respectively, in the range of 70°-88°, and said light-absorbent coating has a refractive index which is approximately equal to that of the substrate of said substrate assembly to which said coating is applied.

3. A dispersive optical device for use as a basic element for wave length separation in a monochromator, a spectroscope or the like, comprising a first and second reflection or transmission grating so arranged on a common substrate that their planes and their grating rules are parallel to each other, the mutual arrangement of the two gratings being such that the light diffracted by the first grating passes through said substrate before striking the second grating and diffracted thereby, said first grating having a diffraction angle of at least 60° and the second grating having an angle of incidence of at least 60°, wherein the angle between a normal to the first grating and a light path between the centers of the gratings is in the range of 70°-88°, and a light absorbent coating, the refractive index of which is close to that substrate, is applied to the optical device, except at the surface portion of the substrate facing away from the gratings.

4. The device as claimed in claim 3 wherein the substrate is transparent, the gratings are applied on either side of the transparent substrate with planar parallel surfaces, and the gratings are arranged mutually displaced in their planes.

5. A device as claimed in claim 4, wherein the first grating has a diffraction angle in the range of 70°-88° and said second grating has an angle of incidence in the range of 70°-88°.

6. The device as claimed in claim 4, further including means for setting the angle of the device in order that light departing from the device parallel to the incident light is of predetermined wavelength.

7. The device as claimed in claim 3, further including means for setting the angle of the device in order that light departing from the device parallel to the incident light is of a predetermined wavelength.

8. The device as claimed in claim 7, further including a mirror pivotable out of and into the path of the departing light and an eye-piece arranged to receive the departing light reflected by the mirror.

9. The device as claimed in claim 3 or 7 further including a wavelength scale provided at the input of the first grating or at the output of the second grating to be readable at the output.

10. The device as claimed in claim 3 further including two devices coupled in series and that the input of the first device is arranged in line with the output of the second device.

11. The device as claimed in claim 3, 5 or 2, wherein said first and second gratings have the same grating frequency.

12. A dispersive optical device for use as an element for wave length separation in a monochromator a spectroscope or the like, comprising a first and a second reflection or transmission grating so arranged on a common substrate that their planes and their grating rules are parallel to each other, the mutual arrangement of the two gratings being such that the light diffracted by the first grating passes through said substrate before striking the second grating, and means for setting the angle of the device in order that light departing from the device parallel to the incident light is of a predetermined wavelength.

13. A dispersive optical device for use as a basic element for wave length separation in a monochromator, a spectroscope or the like, comprising a first and a second reflection or transmission grating so arranged on a common substrate that their planes and their grating rules are parallel to each other, the mutual arrangement of the two gratings being such that the light diffracted by the first grating passes through said substrate before striking the second grating and diffracted thereby, said first grating having a diffraction angle of at least 60° and the second grating having an angle of incidence of at least 60°, said device further including a wavelength scale provided at the input of the first grating or at the output of the second grating to be readable at the output.

14. A dispersive optical device for use as a basic element for wave length separation in a monochromator, a spectroscope or the like, comprising a first and a second reflection or transmission grating so arranged on a common substrate that their planes and their grating rules are parallel to each other, the mutual arrangement of the two gratings being such that the light diffracted by the first grating passes through said substrate before striking the second grating and diffracted thereby, said first grating having a diffraction angle of at least 60° and the second grating having an angle of incidence of at least 60°, further including two devices in a series and that the input of the first device is arranged in line with the output of the second device.

15. The device as claimed in claim 14 or 10, further including means for setting the angle between both devices.

16. The device as claimed in claim 15, further including a focusing element of large focal length between the output of the first device and the input of the second device.

* * * * *

UNITED STATES PATENT AND TRADEMARK OFFICE
CERTIFICATE OF CORRECTION

PATENT NO. : 4,591,270
DATED : May 27, 1986
INVENTOR(S) : Hans O.S. Åhlén

It is certified that error appears in the above-identified patent and that said Letters Patent is hereby corrected as shown below:

On the title page: "[73] Assignee" delete "Institutet för Optisk Forskning, Stockholm, Sweden" and insert -- Spectrogon AB, Taby, Sweden --.

Signed and Sealed this

Nineteenth Day of August 1986

[SEAL]

Attest:

DONALD J. QUIGG

Attesting Officer

Commissioner of Patents and Trademarks